United States Patent
Naudet et al.

(12) 
(10) Patent No.: US 6,218,042 B1
(45) Date of Patent: Apr. 17, 2001

(54) DEVICE FOR ASSEMBLING ELECTROCHEMICAL CELLS TOGETHER TO FORM A BATTERY

(75) Inventors: Jean-Paul Naudet, Buxerolles; Francis Potiron, Fontaine le Comte, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/066,567

(22) Filed: Apr. 27, 1998

(30) Foreign Application Priority Data

Apr. 28, 1997 (FR) .................................................. 97 05206

(51) Int. Cl.⁷ ..................................................... H01M 2/10
(52) U.S. Cl. .............................. 429/97; 429/99; 429/100; 429/159
(58) Field of Search ..................................... 429/123, 149, 429/151, 153, 154, 155, 159, 163, 164, 97, 99, 100, 96

(56) References Cited

U.S. PATENT DOCUMENTS 4,965,148 * 10/1990 Daio et al. ........................... 429/159
5,709,963 * 1/1998 Sim ......................................... 429/99

* cited by examiner

Primary Examiner—Maria Nuzzolillo
Assistant Examiner—Monique M. Wills
(74) Attorney, Agent, or Firm—Sughrue, Mion, Zinn, Macpeak & Seas, PLLC

(57) ABSTRACT

The device for assembling electrochemical cells together (6) side-by-side to form a battery is made up of two identical elements. Each of said elements comprises a base (2) supporting the ends of said cells, said base (2) being formed of an end wall (4) surrounded by an edge band (5), at least one elongate coupling prong (3) for coupling to the other element, which prong is integrally molded with the edge band (5) from which it projects perpendicularly, and complementary means (8, 9) co-operating to hold the two elements (1) assembled together and consisting firstly of a tooth formed on the prong of one of the elements and projecting in a direction that is substantially perpendicular to the assembly direction, and secondly of a recess in the edge band of the other element for receiving said tooth so as to snap-fasten.

5 Claims, 2 Drawing Sheets

DEVICE FOR ASSEMBLING ELECTROCHEMICAL CELLS TOGETHER TO FORM A BATTERY

Figure 1:
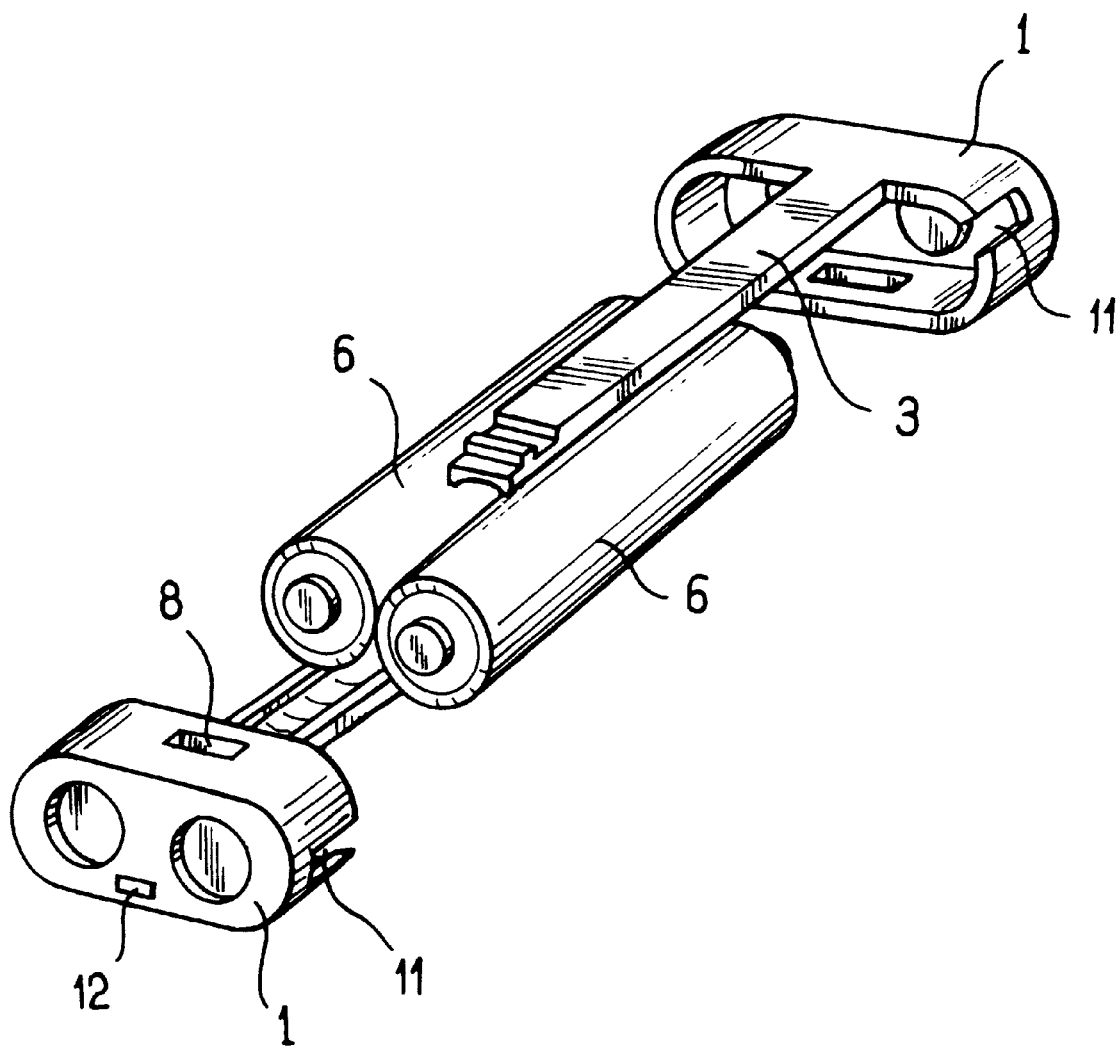

The present invention relates to a device for assembling electrochemical cells together, such as non-rechargeable cells, to make up a battery.

To make up a battery of non-rechargeable cells, one known solution is to put them in a housing which is closed by a cover that is welded or glued in place. The non-rechargeable cells are then no longer visible, and identification means are necessary. In addition, the housing is voluminous. Finally the method of assembly is quite costly because it requires parts having very different shapes and because it requires a plurality of steps.

It is also known for the non-rechargeable cells to be assembled together under a heat-shrinkable sheath. With that known solution, identification means are also necessary. Furthermore, the heat-shrinking method is difficult to control and to industrialize. Finally, the resulting sheath is not strong enough.

Another solution consists in putting the battery between two end plates placed one at each end. The end plates can be glued or force fitted to the ends of the battery, in which case the assembly is not strong enough, or else a separate part can be mounted to couple the end plates together mechanically, which complicates assembly and increases the number of parts required.

Document U.S. Pat. No. 4,806,440 discloses a device for assembling together four cylindrical electrochemical cells side-by-side to form a battery, the device comprising two elements, each of which constitutes a base against which the ends of said cells can bear; one of the elements is provided with elongate prongs for coupling to the other element; the two elements are provided with complementary snap-fastening means that co-operate to hold the two elements assembled together at the ends of said cells. Unfortunately, the cost of that solution is high because the two elements are different, and they require two different injection molds, they need to be stored differently, and they need keying means to be provided for putting them in position for assembly purposes.

Document DE-2 805 067 describes a device for assembling together same-diameter cylindrical objects to form a column. That device is made up of two identical elements, each of which includes a base against which the end of a cell can bear, and one or more longitudinal walls provided with longitudinal recesses, the walls being reinforced on their inside faces. The two elements are provided with centering members, and they are held together in particular by heat sealing. That assembly of electrochemical cells is not strong enough to withstand high stress or impact.

Documents JP-A-6 243 849 and JP-A-8 203 488 also disclose various assembly elements.

An object of the invention is to remedy those drawbacks by providing a novel device for assembling together non-rechargeable cells or other electrochemical cells to form a battery, the device being compact and low cost.

Furthermore, the device should enable the wires and the connectors to pass out through it and it should hold the battery together strongly. Advantageously, it should be non-disassemblable.

The invention achieves this object by means of a device for assembling electrochemical cells together side-by-side to form a battery, the device being made up of two identical elements, said device being characterized in that each of said elements comprises a base against which the ends of said cells can bear, said base being formed of an end wall surrounded by an edge band, at least one elongate coupling prong for coupling to the other element, which prong is integrally molded with said edge band from which it projects perpendicularly, and complementary means co-operating to hold the two elements assembled together at the ends of said cells, said complementary means consisting firstly of a tooth formed on the prong of one of the elements and projecting in a direction that is substantially perpendicular to the assembly direction, and secondly of a recess in the edge band of the other element for receiving said tooth so as to snap-fasten.

The presence of an edge band makes it possible to hold the elements laterally and to reinforce the resistance to impact of the assembly of cells. The edge band must be high enough to make the assembly strong, but low enough to avoid making the device heavier and more costly.

The edge band is advantageously is provided with a notch enabling electrical connections to pass through. Wires may pass through axially or radially.

The two parts required to hold together a battery are exactly identical, and they can be made of semi-rigid plastic by injection molding in a single mold.

To assemble the battery, it is merely necessary to place the parts around the non-rechargeable cells and to snap-fasten them together head-to-tail. No other fixing means are necessary to provide strength for the battery of cells assembled together by the device of the invention. Once it is inserted in the recesses, the teeth lock the assembly, and the parts can no longer be separated.

The parts hold the cells together strongly, they insulate them electrically and mechanically from the surrounding environment (e.g. from impact from hard parts or aggressive objects), and they permit identification (the cells remain visible).

The holding and coupling system of the invention is external to the battery and it is remarkable in that it takes up no space or very little space outside the volume of the envelope occupied by the battery itself.

Furthermore, the empty volume provided inside the envelope volume makes it possible optionally to include safety or other components (electronic components, wires, etc.). Advantageously, the inside face of the prong is shaped to increase the empty volume further.

The device can be adapted to suit any number of cells. In its simplest embodiment, it enables two cylindrical cells to be assembled together. The end walls of the elements are substantially rectangular with rounded corners, and a single prong per element is sufficient to provide good holding strength.

To assemble together four cells, the end walls are square with rounded corners, and each element is provided either with a single prong, or with two prongs disposed on two sides of the square end wall. Moreover, the invention is adaptable to suit various shapes (cylindrical, prismatic) and sizes of cell.

Figure 2A:
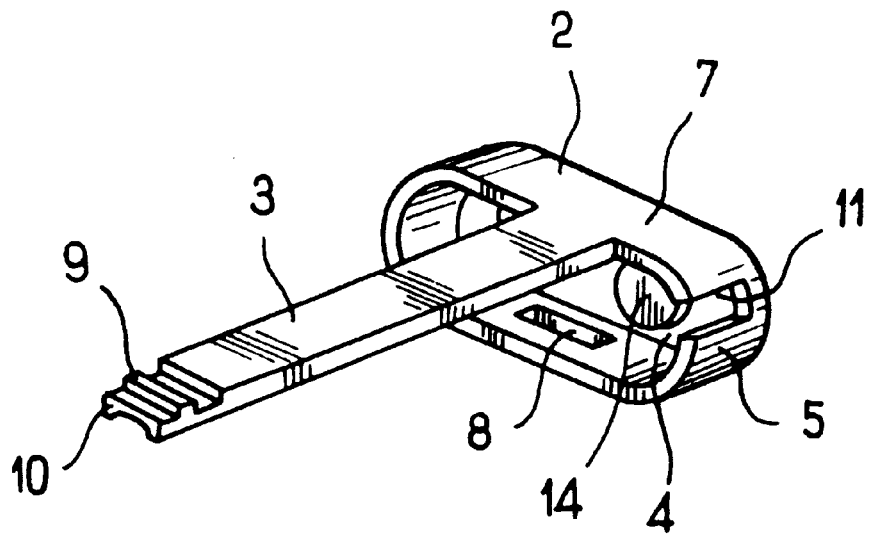
Figure 2B:
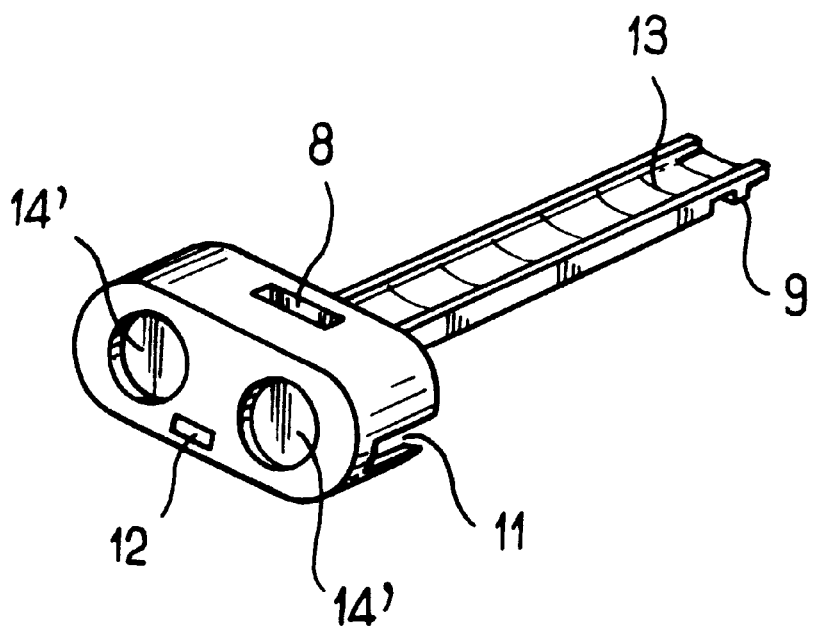

Other characteristics and advantages of the invention appear from the following description of a particular embodiment given with reference to the accompanying drawings, in which:

FIG. 1 is an exploded perspective view of two non-rechargeable cells suitable for being held by two identical elements of the invention; and FIGS. 2A and 2B are perspective views of two such identical elements shown opposite ways round disposed ready to form the assembly of the invention.

Each holding element 1 is preferably made of molded electrically insulating semi-rigid plastic and comprises a cell-receiving base 2 and a snap-fastening coupling prong 3.

The base 2 is constituted by an elongate end wall 4 surrounded by an edge band 5 of height lying in the range 5 mm to 10 mm, for example. The end wall and the edge band are shaped to receive two side-by-side cylindrical non-rechargeable cells 6 snugly, and their long sides 7 may optionally be slightly concave.

The prong 3 is integrally molded with the edge band 5 and it extends perpendicularly therefrom, preferably in the middle of one of its long sides because the non-rechargeable cells leave enough space between them to enable the prong 3 to bend for the purposes of being snap-fastened to the opposite element. The length of the prong is considerably greater than the height of the edge band. The length of the prong plus the height of the edge bands situated at either end is equal to the height of electrochemical cells to be assembled together, i.e. 62 mm for AA format cells, for example.

In order to achieve the snap-fastening, the edge band 5 of the base is provided with a recess 8 in its inside wall, in the middle of the long side opposite the long side from which the prong 3 extends. The recess 8 can receive a corresponding tooth 9 formed towards the end of the prong 3, if necessary in an indentation 10. In the case shown in the figures, the tooth 9 is so shaped that once it is locked in the recess 8, the outside face of the device is substantially plane.

If the recess 8 is not a through recess, it is absolutely impossible to release the coupled snap-fastening from the outside. But even with a through recess as shown, disassembly is difficult to achieve without tools because of the rigidity of the prong.

The edge band 5 is provided with a notch 11 through which the connections can be passed radially. An axial outlet, such as the opening 12 in the end wall 4, may also be provided.

Advantageously, the inside face of the prong 3 is shaped in the form of a trough 13 making a volume available that can optionally receive safety or other components (electronic components, wires, etc.).

It is also possible to provide projections 14 (FIG. 2A) on the end wall 4, which projections serve to wedge the non-rechargeable cells (the projections correspond to the indentations 14' in FIG. 2B). By adjusting the height of these projections 14 in the mold, the mold can be adapted to make devices suitable for various cell heights.

The device of the invention offers many advantages over known devices.

It does not increase the envelope volume of the electrochemical cell assembly, rather it reduces the overall volume by making it possible to house certain components inside the envelope volume.

It is almost impossible to disassemble, thereby guaranteeing user safety. Well enclosed inside the device of the invention, the cells are inaccessible.

It is cheap to produce and to implement. By way of example, the assembly is expected to be in the range 20% to 30% cheaper to produce. The quantity of material required is small. Manufacturing the device is made simpler by the two parts being identical, and more versatile because it is easy to adapt the mold and therefore the parts it produces to suit various cell formats. Finally, it is easier and quicker to assemble electrochemical cells together by means of the device of the invention.

What is claimed is:

1. A device for assembling electrochemical cells together (6) side-by-side to form a battery, the device being made up of two identical elements (1), said device being characterized in that each of said elements comprises:
   a base (2) against which the ends of said cells can bear, said base (2) being formed of an end wall (4) surrounded by an edge band (5);
   at least one elongate coupling prong (3) for coupling to the other element, which prong is integrally molded with said edge band (5) from which it projects perpendicularly; and
   complementary means (8, 9) co-operating to hold the two elements (1) assembled together at the ends of said cells (6), said complementary means consisting firstly of a tooth formed on the prong of one of the elements and projecting in a direction that is substantially perpendicular to the assembly direction, and secondly of a recess in the edge band of the other element for receiving said tooth so as to snap-fasten (8, 9).

2. A device according to claim 1, in which said end wall (4) is provided with projections (14) serving to wedge said cells.

3. A device according to claim 1, in which the base (2) is provided with an axial outlet (12) enabling electrical connections to pass through.

4. A device according to claim 1, in which the edge band (5) is provided with a notch (11) enabling electrical connections to pass through.

5. A device according to claim 1, in which the inside face of said prong (3) is shaped in the form of a trough (13), thereby offering an available volume.

* * * * *